Patented Sept. 12, 1950

2,521,906

UNITED STATES PATENT OFFICE 2,521,906

METHOD OF MAKING METHOXYETHYL STEARATE

William M. Gearhart, Kingsport, and Margaret Broyles, Johnson City, Tenn., assignors to Eastman Kodak Company, Rochester, N. Y., a corporation of New Jersey No Drawing. Application September 19, 1946, Serial No. 697,908

10 Claims. (Cl. 260—410.6)

This invention relates to a method of manufacturing esters of the higher acids and particularly to a method of manufacturing methoxyethyl stearate in which the temperature is restricted during the esterification and the resulting product is recovered after neutralizing the mass with an alkaline magnesium or calcium compound.

In the use of esters as plasticizers in plastic compositions it has been observed that at times exudation of the plasticizer occurs. By exudation is meant the tendency of the plastic to undergo separation of plasticizer and base material. This usually results in the surface of the plastic becoming coated with a white, greasy film. It has been observed that in the case of methoxy-ethyl stearate used for plasticizing high molecular weight compounds, particularly cellulose esters such as cellulose acetate, cellulose propionate, or cellulose acetate butyrate, that exudation of the methoxyethyl stearate has in some instances been quite pronounced when the material by that name is used which has been marketed in the past. We have found that the cause of this exudation of methoxyethyl stearate is apparently the comparatively high acidity in the commercially available methoxyethyl stearate and the presence of ethylene glycol mono- and di-esters therein. We have found that methoxyethyl stearate, as well as certain other esters, can be prepared which are not susceptible to exudation if the esterification process and the refining of the resulting product is carried out in accordance with our invention.

Methoxyethyl stearate is ordinarily prepared by reacting $\beta$-methoxy ethanol with stearic acid in the presence of an acid catalyst, such as sulphuric acid. After the esterification has been carried out using an elevated temperature to remove water from the mass and therefore drive the reaction to the right, the mass is then neutralized and the methoxyethyl stearate is separated from the salts which are formed by such neutralization. We have found that when methoxyethyl stearate is formed in this fashion that there is danger of formation of ethylene glycol mono- or distearate upon the breakdown of the $\beta$-methoxy ethanol to ethylene glycol and that the presence of this impurity to the extent of 0.3% or more may result in a product which tends to exude from the plastic compositions in which it is used. We have also found that the use of dry soda ash or sodium bicarbonate for neutralizing the crude reaction mixture after the esterification is completed may not give an adequate neutralization of the free stearic acid in the resulting product. If it is attempted to neutralize the catalyst and any free organic acid present in a batch of the crude ester with the soda ash or sodium bicarbonate in water solution, an emulsion or gel may be obtained which cannot be separated from the methoxyethyl stearate which is formed without great difficulty.

One object of this invention is to provide an improved process for preparing esters of acids containing from fourteen to eighteen carbon atoms, such as myristic, palmitic, and stearic acids.

One particular object of our invention is to provide a method for preparing methoxyethyl stearate which gives a product having a low acidity value. Another object of our invention is to provide a method of preparing methoxyethyl stearate in which the formation of any ethylene glycol esters is so reduced that the quantity therein is usually less than 0.3%. A further object of our invention is to provide a method of making a methoxyethyl stearate which does not exude when employed for plasticizing high polymerized materials, particularly cellulose esters.

We have found that either of the following steps contributes to the obtaining of improved esters, such as methoxyethyl stearate which is good as to exudation characteristics and that the use of both of these steps gives a product in which exudation is avoided when the product is employed for plasticizing polymeric materials. These steps are illustrated by the following:

(1) The reaction between the hydroxy compound, such as $\beta$-methoxy ethanol and the stearic acid or other acid is carried out at a temperature between 70 and 120° C., accomplished either by carrying out the esterification in a vacuum or by carrying out the esterification with a suitable azeotrope-forming agent present in the reaction mass.

(2) After the methoxyethyl stearate, or other ester of the class described has been formed, the mass is neutralized with a dry alkaline magnesium or calcium compound, such as dry magnesium or calcium oxide. In this manner the acidity of the resulting methoxyethyl stearate is reduced to a point at which exudation in use of that material is substantially avoided. Another feature which is desirable in preparing a methoxyethyl stearate which is free of exudation is to avoid the presence of fatty acids in the reaction having a chain length greater than eighteen carbon atoms. For instance, ordinary commercial triple pressed stearic acid which contains approximately equal parts of stearic and palmitic acids is a satisfactory raw material for use in preparing methoxyethyl stearate.

In the preferred operation our invention may be carried out by placing $\beta$-methoxy ethanol and commercial stearic acid, the former present preferably in at least 100% excess, in a reaction vessel together with a small percentage (such as 0.1%) of sulphuric acid. The proportion of catalyst used is not critical. However, this may be very small, such as from 1% to 0.01%. The esterification may be run either by using a vacuum or by adding benzene or other suitable azeotrope-forming agents to the reaction vessel. If an azeotrope-forming agent is used, it is desired to use an amount about equal to that of the alcohol employed with continuous return of the azeotrope-forming agent to the reaction vessel.

If desired, the esterification may be carried out in a conventional still having a base heater, under a vacuum so that the temperature will be held within the range of 70–120° C., preferably at 90° C. For instance, the reaction goes well and the water formed in admixture with some of the alcohol distills off if the mass is kept under 16–25 inches of vacuum (i. e. 16–25 inches of mercury). The base heater is held at an elevated temperature, such as 90° C. whereby the alcohol-water mixture distills over at 50–60° C. After the esterification is completed, such as in about an hour or two, the excess alcohol present in this system may be removed by raising the temperature of the base heater from 90° C. to 120° C. or even higher, say up to 150° C. for a short period while maintaining the vacuum after neutralizing the catalyst. If an azeotrope-forming agent is used, such as benzene, toluene, butyl acetate, or the like, it is desirable to maintain an accurate temperature control, thereby keeping the percentage of alcohol down in the benzene-water-alcohol ternary mixture or other mixture which distills out of the reaction mixture.

After the excess alcohol has been removed from the reaction mass, the crude plasticizer may then be treated with further alkaline magnesium or calcium compound. For this purpose dry magnesium or calcium oxide is particularly useful. This neutralization may be carried out by adding an excess of magnesium or calcium oxide and agitating the mass well at 100° C. for at least one hour. In the case of calcium oxide it is even desirable to use a longer time of heating and agitation. The neutralized batch is then cooled to at least 40° C. and the salts which form because of the neutralization, precipitate and may be filtered off. It is desirable, however, to cool before filtration because with a hot filtration continued precipitation or crystallization of salts from the mass may occur. The resulting product after removing all of the salts therefrom exhibits an acidity well below .1%. If the resulting product exhibits coloration, decolorizing in the usual manner with carbon black, or a mixture of carbon black and alkaline magnesium or calcium compound may be employed prior to the use thereof.

The following examples illustrate the preparation of methoxyethyl stearate in accordance with our invention; as well as the preparation of certain other esters.

I. Preparation of methoxy ethyl stearate using benzene as an entrainer:

*Reaction*

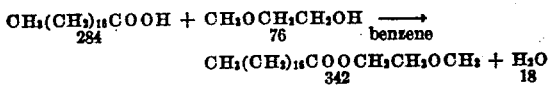

*Operational*

In a 5-liter, round-bottomed flask were placed 1420 grams (5 moles) of stearic acid, 380 grams (5 moles) of monomethyl ether of ethylene glycol, 500 ml. of benzene and 1 gram of concentrated $H_2SO_4$. An automatic decanting reflux condenser was used. The monomethyl ether of ethylene glycol formed a ternary azeotrope with the benzene and water, so after three hours of reflux, an additional 100 grams of monomethyl ether of ethylene glycol were added. The mixture was allowed to reflux overnight after which time 178 ml. of a benzene insoluble layer had been collected. This consisted of water and ethylene glycol ether and perhaps a small amount of benzene. Another 100 grams of ethylene glycol ether were added and reflux continued for two more hours, however, no further evidence of reaction was noted so the reaction was discontinued. The remaining product was neutralized with 10% $NaHCO_3$ solution and the excess water and benzene removed by heating on a steam cone under reduced pressure. As will be apparent from the further examples, this type of neutralization is not preferred. The resulting material was placed in a 2-liter, round-bottomed flask and distilled through a twelve-inch packed column. After the removal of final traces of water, benzene and monomethyl ether of ethylene glycol, the remaining material was collected in fractions. The product was a pale yellow liquid solidifying at or just below room temperature.

Subsequent work showed that methoxy ethyl stearate so made, using benzene azeotrope, is free of diester contamination. Such a product does not readily exude from plastics.

II. Preparation of stearate ester using monomethyl ether of ethylene glycol as an entrainer:

*Reaction*

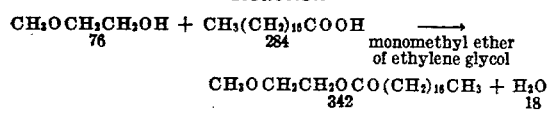

*Operational*

Sixty pounds of stearic acid and 24 pounds of monomethyl ether of ethylene glycol (50% excess) were mixed and placed in a large water bath which was heated with steam, the stearic acid melting and dissolving on standing overnight. The resulting hot mixture was placed in a reactor with 125 grams of acid catalyst (.5% based on stearic acid) and maintained at such a temperature as to distill off the ethylene glycol ether-water binary at 99° C. but not the ethylene glycol ether itself. The temperature of the liquid in the circulatory leg was 100°–101° C. The temperature of the vapors leaving the reactor was 99° C. However, after removal of the water already present in the mixture the temperature at the top of the column dropped and the temperature of the base heater was raised. The catalyst content was raised to 1% and the unit was rearranged so that the distillate passed through the lower column section. Under these conditions the reaction was carried to completion. The material was removed from the base heater and neutralized with 1 pound of $NaHCO_3$ in 1 gallon of $H_2O$ by agitating for 3–4 hours. The neutralized batch was returned to the reactor and heated under reduced pressure to remove the water and excess ethylene glycol monomethyl ether. The resulting product was distilled under vacuum batchwise. While an improved product was obtained, it was not as good as the product obtained using alkaline earth neutralization.

III. Preparation of stearate ester using toluene as an entrainer:

*Reaction*

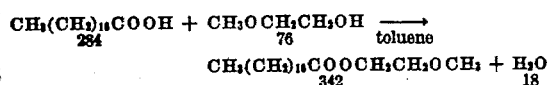

Operational

About 5,680 grams (20 moles) of stearic acid, 2,280 grams (20 moles + 50% excess) of ethylene glycol monomethyl ether, 1,000 ml. of toluene and 28 grams (.5%) of concentrated $H_2SO_4$ were mixed in a 12-liter, round-bottomed flask fitted with an automatic decanting reflux condenser. The temperature of the base heater and distillate was checked at intervals and recorded. The average temperature of the base heater was 115° C. and 95° C.–89° C. for the distillate. The batch was neutralized with 3% $NaHCO_3$ + 3% CaO + $H_2O$. The low boilers were removed by heating the batch on the steam cone under reduced pressure (steam jet vacuum) and filtered before distilling under vacuum, collecting the fractions. The toluene did not appear to act as efficient as benzene when used as an azeotropic agent.

IV. Preparation of stearate ester under vacuum at 25 mm.:

A. Neutralized with $NaHCO_3$

Reaction

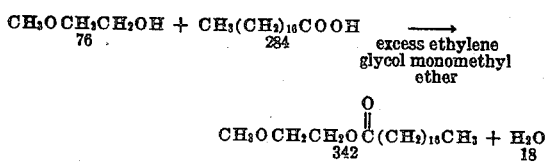

Operational

About 2,840 grams (10 moles) of stearic acid, 1,140 grams (10 moles + 50% excess) of ethylene glycol monomethyl ether and 14 grams (.5% based on stearic acid) of concentrated $H_2SO_4$ were mixed in a 5-liter, 3-necked flask fitted with a cello-grease-sealed stirrer, a thermometer in the base heater, and a column with a downward condenser and receiver attached to a steam jet vacuum line. The distillate and base heater temperatures were recorded at hourly intervals. The base heater temperature was maintained below 70° C. and the distillate temperature below 60° C. throughout the reaction.

After several hours the reaction was stopped and the batch purified as follows: added 100 grams of $NaHCO_3$ + 100 c. c. of $H_2O$. The ester was recovered by passing steam in the flask causing two layers to form. The ester was washed with hot water until the washing was clear. The low boilers were removed by heating on the steam cone under reduced pressure (aspirator vacuum) and filtered. The entire batch was treated with 3% Nuchar for 3½ hours at 80° C. and filtered.

Other runs were made to neutralize methoxy ethyl stearate with MgO. During succeeding runs the time for the preparation of methoxy ethyl stearate was greatly decreased from 28 hours reaction time to 8 hours using a 100% excess of ethylene glycol monomethyl ether and the yield was increased from 72–90% by neutralizing with 2.3% MgO (powder) between the temperature of 70°–120° C.

B. Neutralized with MgO powder

Operational

Approximately 1970 grams (6.20 moles) of stearic acid, 1520 grams (20 moles) of ethylene glycol monomethyl ether and 9.8 grams (.5% based on stearic acid) of concentrated $H_2SO_4$ were refluxed in a 12-liter, round-bottomed flask fitted with a thermometer, column and downward condenser attached to a steam jet vacuum (25 mm.). The reaction was stopped and 10 grams of powdered MgO added to neutralize the catalyst and free stearic acid. The excess ethylene glycol ether was removed by heating the batch under steam jet vacuum to 120° C. While the batch was still warm 5% Celite + 5% Nuchar were added and the mixture was then allowed to cool to room temperature to filter.

Sulfuric acid was found to be a very satisfactory catalyst for synthesizing methoxy ethyl stearate after using fluoboric acid, phosphoric acid, toluene sulfonic acid and $K_2S_2O_7$ in separate check runs.

V. Preparation of the palmitate ester under vacuum at 25 mm.:

Reaction

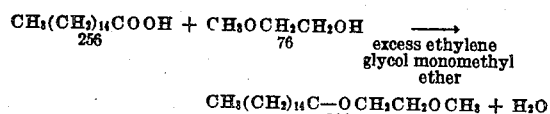

Operational

In a 5-liter, 3-necked, round-bottomed flask were reacted 2048 grams (8 moles) of palmitic acid, 1216 grams (8 moles + 100% excess) of ethylene glycol monomethyl ether and 1.4 grams (.5% based on palmitic acid) of concentrated $H_2SO_4$. The flask was fitted with a cello-grease-sealed stirrer, a thermometer and a column with downward condenser and receiver with vacuum pump attachments.

The batch was neutralized by adding 10 grams of powdered MgO and the excess ethylene glycol ether removed by heating to 118° C. under vacuum (25 mm.). The ester was distilled after filtering under vacuum collecting the following fractions:

1, 250 grams at 59°–179° C. at 1 mm.
2, 1992 grams at 179°–182° C. at 1 mm.
3, Slight residue.
Yield: 79%.

VI. Preparation of oleate ester using excess ethylene glycol monomethyl ether as an entrainer:

Reaction

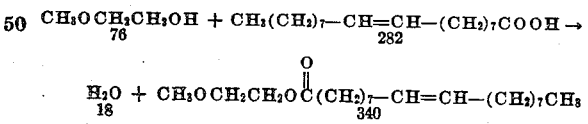

Operational

Approximately 1040 grams (10 moles+50% excess) of ethylene glycol monomethyl ether, 2820 grams (10 moles) of oleic acid and 5 grams of concentrated $H_2SO_4$ were placed in a 5-liter, round-bottomed flask fitted with an automatic decanting reflux condenser. The acid number was 4.5 mg. KOH/gram of ester after several hours of reflux showing a 98% complete reaction. The reaction was stopped and neutralized. The ester was salted out after each washing. The low boilers were removed by warming on the steam cone under aspirator vacuum. The residue was distilled under vacuum collecting the fractions. Analysis of fraction #3 showed a good yield of a good quality ester.

From the several examples above it may be seen that we have provided an improved method for making esters of the higher acids, such as acids having from 14 to 18 carbon atoms in their molecule. The resultant esters are of improved quality and particularly suitable for use as plasticizers.

In general, in the operation of our process we prefer to remove the water liberated in the esterification reaction at lower temperatures preferably below the decomposition temperature of certain compounds contained in the reaction mixture. This low temperature removal may be accomplished by the use of reduced pressure or the addition of an azeotrope-forming agent as already described in detail.

It is preferred to neutralize the catalyst reasonably promptly after the esterification reaction is completed in order to prevent the residual effect of the catalyst from in any way contributing to a breakdown of the components present in the reaction mass. This neutralization is preferably accomplished by an alkaline earth derivative such as the oxide or carbonate of magnesium. However, as indicated above, derivatives of calcium or other of the alkaline earths may also be used but are not as effective as magnesium oxide and in the event of their use a longer and more thorough neutralization treatment is applied. In this neutralization step conventional materials, such as on a small scale batch, as sodium carbonate may also be used but are not preferred.

After the neutralization, the excess hydroxy compound and low boilers may be removed, preferably by the application of reduced pressure, to facilitate the removal at a lower temperature. However, in this removal step, particularly if acid catalyst has been thoroughly neutralized as described, the temperature may be permitted to rise above 120° C. for a short period for flashing off any residual hydroxy compound.

In the final treatment of the resultant ester, it is preferred to thoroughly contact the ester with additional alkaline earth derivatives such as with magnesium oxide, together with a decolorizing agent, such as carbon. This treatment may be accomplished with heating to within a temperature range of 90° C.–100° C. for an hour or so to eliminate any free organic acid in the ester. In other words, in the instance that stearic acid has been used, the magnesium forms magnesium stearate therewith.

After the neutralization of any free organic acid the ester is preferably cooled to within such temperature range that the alkaline earth salts formed in the neutralization will precipitate or otherwise deposit out. In the case of the magnesium stearate the cooling is preferably below 30° C., at which temperature magnesium stearate separates out. Upon filtration, centrifugation, or other separatory treatment the ester is finally separated from such salts and decolorizing additions.

The finished ester may be given a further vacuum distillation treatment if desired. However, the ester formed by our process may be used substantially directly as a plasticizer.

In the above process while we have frequently described the use of sulfuric acid as the esterification catalyst as this is commonly used commercially, other well-known esterification catalyst may be employed such as hydrochloric acid, the sulfonic acids, or various acid salts. Likewise for the decolorization treatment, in place of activated carbon, other decolorizing agents, such as the various diatomaceous earths may be used. By the term alkaline earth neutralizing agent we refer to compounds such as oxides and carbonates of magnesium, calcium, and the like, as described above. By the term hydroxy compound, reference is made to methoxy, ethoxy ethanol and similar well known ether alcohols which are a commercially obtainable material. In regard to organic acids, the use of commercial sources thereof are contemplated such as hydrogenated tallow, hydrogenated fish oils, etc., but sources containing large amounts $C_{20}$ and $C_{22}$ acids are preferably avoided as contributing to the production of an ester which might exude when used as a plasticizer. Inasmuch as such commercial sources of organic acids may comprise mixtures of acids, such as mixtures of stearic acid with palmitic and/or oleic acids the production of mixed esters by the procedure of the present invention is likewise contemplated. Other changes and variations will be apparent. Hence, it is not desired to be restricted excepting insofar as is necessitated by the prior art and the spirit of the appended claims.

We claim:

1. A process for the preparation of esters of aliphatic acids having 14–18 carbon atoms in their molecule which comprises reacting together an alkoxy alkanol and an aliphatic acid of 14–18 carbon atoms by means of an acid esterification catalyst at 70–120° C., upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby aliphatic acid in the mass is neutralized, cooling the mass to a sufficiently low temperature to precipitate the alkaline earth metal salts thus formed and separating the ester from those salts.

2. A process for the preparation of esters of aliphatic acids having 14–18 carbon atoms in their molecule which comprises reacting together an alkoxy alkanol and an aliphatic acid of 14–18 carbon atoms by means of an acid esterification catalyst at 70–120° C. under reduced pressure of 16–25 inches of mercury, upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby aliphatic acid in the mass is neutralized, cooling the mass to a sufficiently low temperature to precipitate the alkaline earth metal salts thus formed and separating the ester from those salts.

3. A process for the preparation of esters of aliphatic acids having 14–18 carbon atoms in the molecule which comprises reacting together an alkoxy alkanol and an aliphatic acid of 14–18 carbon atoms by means of an acid esterification catalyst at 70–120° C. which reaction is conducted in the presence of an azeotrope-forming agent, upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby aliphatic acid in the mass is neutralized, cooling the mass to a sufficiently low temperature to precipitate the alkaline earth metal salts thus formed and separating the ester from those salts.

4. A process for preparing an alkoxy alkyl stearate which comprises reacting together an alkoxy alkanol and stearic acid by means of an acid esterification catalyst at 70–120° C., upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby any free aliphatic acid in the mass is neutralized, cooling the mass to a sufficiently low temperature to precipitate the alkaline earth metal salts thus formed and separating the alkoxy alkyl stearate from those salts.

5. A process for preparing esters of aliphatic acids having 14–18 carbon atoms in their molecule which comprises reacting together an alkoxy ethanol and an aliphatic acid of 14–18 carbon atoms by means of an acid esterification catalyst at 70–120° C., upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby aliphatic acid in the mass is neutralized, cooling the mass to a sufficiently low temperature to precipitate the alkaline earth metal salts thus formed and separating the ester from those salts.

6. A process for preparing methoxyethyl esters of aliphatic acids having 14–18 carbon atoms in their molecule which comprises reacting together methoxy ethanol and an aliphatic acid of 14–18 carbon atoms by means of an acid esterification catalyst at 70–120° C., upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby aliphatic acid in the mass is neutralized, cooling the mass to a sufficiently low temperature to precipitate the alkaline earth metal salts thus formed and separating the ester from those salts.

7. A process for preparing methoxyethyl stearate which comprises reacting together methoxy ethanol and stearic acid by means of an acid esterification catalyst at 70–120° C., upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby aliphatic acid in the mass is neutralized, cooling the mass to a sufficiently low temperature to precipitate the alkaline earth metal salts thus formed and separating the ester from those salts.

8. A process for preparing methoxyethyl palmitate which comprises reacting together methoxy ethanol and palmitic acid by means of an acid esterification catalyst at 70–120° C., upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby aliphatic acid in the mass is neutralized, cooling the mass to a sufficiently low temperature to precipitate the alkaline earth metal salts thus formed and separating the ester from those salts.

9. A process for preparing methoxyethyl myristate which comprises reacting together methoxy ethanol and myristic acid by means of an acid esterification catalyst at 70–120° C., upon the completion of the esterification neutralizing the acid esterification catalyst with an inorganic alkaline neutralizing agent and removing the unreacted alcohol from the mass by distillation at a temperature not to exceed 150° C., then adding to the mass an alkaline alkaline-earth metal compound and heating at 90–100° C. for at least an hour whereby aliphatic acid in the mass is neutralized, cooling the mass to a sufficiently low temperature to precipitate the alkaline earth metal salts thus formed and separating the ester from those salts.

10. A process for the preparation of esters of aliphatic acids having 14–18 carbon atoms in their molecule which comprises reacting together an alkoxy alkanol and an aliphatic acid of 14–18 carbon atoms by means of an acid esterification catalyst at 70–120° C., upon completion of the esterification neutralizing the acid esterification catalyst with an alkaline alkaline-earth metal compound and removing the unreacted alcohol from the mass by distillation at a temperature not to exceed 150° C., then adding to the mass an alkaline magnesium compound and heating at 90–100° C. for at least an hour whereby aliphatic acid in the mass is neutralized, cooling the mass to a sufficiently low temperature to precipitate the magnesium salts thus formed and separating the ester from those salts.

WILLIAM M. GEARHART.
MARGARET BROYLES.

REFERENCES CITED

The following references are of record in the file of this patent:

UNITED STATES PATENTS

| Number | Name | Date |
|---|---|---|
| 1,613,366 | Van Schaack | Jan. 4, 1927 |
| 1,701,703 | Starrels | Feb. 12, 1929 |
| 1,739,315 | Kessler | Dec. 10, 1929 |
| 1,869,660 | Buckley | Aug. 2, 1932 |
| 2,010,560 | North | Aug. 6, 1935 |
| 2,056,656 | Ellis | Oct. 6, 1936 |
| 2,366,737 | Loder | Jan. 9, 1945 |